G. VERHOOGEN.
MANUFACTURE OF HARD TOE BLOCKS AND THE LIKE FOR FOOTWEAR.
APPLICATION FILED APR. 10, 1919.

1,339,529. Patented May 11, 1920.

UNITED STATES PATENT OFFICE.

GUSTAVE VERHOOGEN, OF BRUSSELS, BELGIUM.

MANUFACTURE OF HARD TOE-BLOCKS AND THE LIKE FOR FOOTWEAR.

1,339,529.  Specification of Letters Patent.  Patented May 11, 1920.

Application filed April 10, 1919. Serial No. 289,170.

*To all whom it may concern:*

Be it known that I, GUSTAVE VERHOOGEN, a subject of the King of the Belgians, residing at Brussels, Belgium, have invented new and useful Improvements in and Relating to the Manufacture of Hard Toe-Blocks and the like for Footwear, of which the following is a specification.

The present invention has for its object improvements in the manufacture of hard toe blocks and the like for footwear and apparatus for producing the same and consists in making such blocks supple after being impregnated with a solution of cellulose, by means of acetone or an equivalent agent.

In carrying out my invention, any suitable substance or fabric is first impregnated mechanically, or by hand, with a solution of cellulose such as for instance 25 parts of cellulose dissolved in 300 parts of pure acetone, (ethyl ketone), which produces a resultant substance comparatively hard for the purpose. To this solution a preparation could be added as an accessory in order to deodorize it and reduce its inflammability.

From the product that is so obtained, I proceed to cut out toe blocks and the like of the shape desired, and then proceed to make the blocks supple by placing them in a container or liquid tight box having a layer of felt saturated with acetone or other equivalent solvent along its base, the said container or box being of varying shapes and dimensions as may be required and which is provided with an airtight lid.

My invention will be more readily understood with reference to the accompanying drawing, in which.

Figure 1:
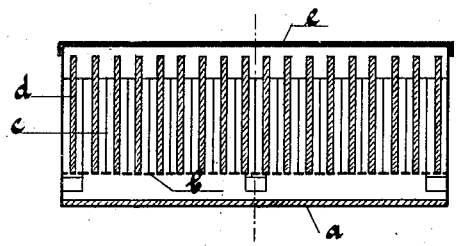
Figure 1 is a longitudinal section of the container or liquid-tight box with the pieces of fabric or the like to be treated in their respective positions.
Figure 2:
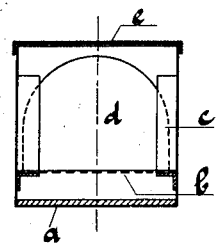
Fig. 2 is a transverse section of the same.
Figure 3:
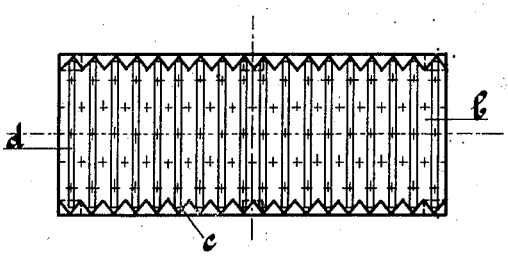
Fig. 3 is a plan of the box, the lid being removed.

The base of the container is provided with a covering of felt $a$ which is saturated with acetone or an equivalent agent suitable for the purpose.

Situated a suitable distance from the base of the container I also provide a movable division $b$ having cross pieces or bars in the form of a grille, which grille is supported by means of corner brackets or the like $f$. On the grille $b$ is placed a member $c$ having corrugated walls which will act as distance pieces and prevent the toe blocks and the like $d$ from keeping close contact with each other during treatment. Also the container or box proper is provided with a lid $e$ capable of being hermetically sealed upon the box.

After remaining in the container or box for the desired period, the blocks will become supple due to the vapors given off from the acetone or other agent with which the felt covering $a$ is saturated, when they are then withdrawn and are ready for the purpose for which they are required.

The present process will be economical and good and rapid results are obtained.

While I have explained my invention as suitable for the tread movement of the blocks it will be readily understood the resultant product may be suitable for other purposes such as for example heel blocks.

I claim:

1. A process of manufacturing toe or heel blocks for footwear, consisting in treating material impregnated with cellulose in order to make it supple by means of vapors arising from acetone in a suitably arranged container or apparatus.

2. Apparatus for softening toe blocks comprising a liquid tight container, a felt pad on the bottom thereof, corner brackets, a grille supported thereon, and movable separating members, mounted on the grille.

In testimony whereof I have signed my name to the specification.

GUSTAVE VERHOOGEN.

Witnesses:
T. Y. ZABAUL,
EMIL VOM WENREELE.